US005419026A

United States Patent [19]

Grabher

[11] Patent Number: 5,419,026

[45] Date of Patent: May 30, 1995

[54] TOOL FOR ANCHORING A HOUSING BARREL

[75] Inventor: Guenther Grabher, Fussach, Austria

[73] Assignee: Grass AG, Hochst Vlbg., Austria

[21] Appl. No.: 195,371

[22] Filed: Feb. 14, 1994

Related U.S. Application Data

[63] Continuation of Ser. No. 969,758, Oct. 28, 1992, abandoned.

[30] Foreign Application Priority Data

Oct. 31, 1991 [DE] Germany ........................ 9113559 U

[51] Int. Cl.[6] ................................................ B23P 11/00

[52] U.S. Cl. ................................................ 29/243.518

[58] Field of Search ..................... 29/243.518, 243.517, 29/512, 523, 432; 72/393

[56] References Cited

U.S. PATENT DOCUMENTS

| | | | |
|---|---|---|---|
| 318,927 | 5/1885 | Rothlisberger | 29/243.518 |
| 1,557,845 | 10/1925 | Johnston | 29/243.518 |
| 3,657,797 | 4/1972 | Robinson | 29/243.518 |

*Primary Examiner*—Robert C. Watson

[57] ABSTRACT

A tool for anchoring a housing barrel where in the barrel has a plurality of expandable claws, the tool comprising a support plate moveable axially and a plunger associated with the plate moveable therewith. The plunger has a plate engaging in and a tapered point. The tapered point is arranged to cooperate with an expansion tool consisting of a bowl cage, and a number of balls arranged around the cage periphery. Each ball is brought opposite the claw it is to deform. When the tapering point of the plunger penetrates the ball cage, the bails are displaced radially outward and thus deform the claws radially outwardly in the hole of the door section.

1 Claim, 4 Drawing Sheets

TOOL FOR ANCHORING A HOUSING BARREL

This application is a continuation application based on U.S. patent application Serial No. 07/969,758 filed Oct. 28, 1992, now abandoned.

BACKGROUND OF THE INVENTION

This invention relates to a tool for anchoring a housing barrel in a plate of a section of a piece of furniture.

In recent times, barrel hinges have been designed in two parts, whereby a housing barrel can be mounted in the hole made in the door section. The housing barrel can be locked by means of a turning lock with the hinge barrel mounted on the hinge side. The purpose of this arrangement is to provide the furniture doors with the housing barrel already at the plant without these parts being troublesome during handling. Furniture doors can thus be stacked flat on each other without the risk of damage because of projecting parts.

In order to anchor this kind of housing barrel in the corresponding hole in the furniture section, use is made of a known method of designing the housing barrel as a drive-in barrel. In this case, ribbings are arranged on the outer circumference in the area of the side walls of this housing barrel, so that the housing barrel can be anchored in the door hole with a suitable forcing tool.

This kind of mounting has been found to be disadvantageous, however, because it is not stable.

SUMMARY OF THE INVENTION

The object of the innovation is thus to design a tool for anchoring the housing barrel in the hole of the furniture part sot hat the connection of the housing barrel in the door part is simple yet it can withstand high loads. However, the innovation is not limited to anchoring of housing barrels in corresponding holes in the door part, rather the scope of application relates to the anchoring of barrel-shaped housing parts in any holes. There are such anchorings, for example in the area of drawer fronts for connection of the drawer front with the side wall of the drawer.

It is also possible to connect corresponding side walls of furniture units with other flat parts, use being made of connection components that also have barrel-like parts that must be anchored in corresponding holes.

The technical instruction give in claim 1 serves to achieve the object of the invention.

The essential feature of the innovation is that an expansion tool is suggested, which basically consists of a screw-on plate designed to be displaced in the direction of the surface of the furniture unit and which is connected with a suitable advance mechanism, for example, with the piston rod of a cylinder. This displaceable screw-on plate is guided in associated guides so that it can be displaced vertically with respect to the surface of the furniture part.

Also connected with the screw-on plate is a hold-down making flush contact with the surface of the door section and centering the entire tool relative to the hole in the door section while also securing the housing barrel if need be.

The essential feature is thus a linearly moveable screw-o plate, the movement of which is converted into a radially outward directed spreading movement. A plunger connected with the screw-on plate is run into the interior of the housing barrel, and this plunger acts on a radially outward driven expanding tool, which lies against the inner sides of the claws of the housing barrel with its radially outward lying ends, and deforms the claws in a radially outward direct so that they bend and dig into the material of the side wall of the hold in the door section.

This thus causes a radially outward directed expansion of the claws of the housing barrel in the material of the door section.

The design of the expansion tool is described in more detail using a number of preferred embodiments. Protection is claimed separately for each embodiment and its description.

A plunger is mounted on a screw-on plate, the screw-on plate being mounted on a piston rod of a tool that can be moved axially in the direction of the plunger. A guide for a hold-down is arranged on the bottom side of the screw-on plate. The hold-down is placed on the furniture surface of a door section. The housing barrel is inserted in the hole of the door section and it has claws in the side wall, which are to dig into the side wall of the hole in the door section through the movement of the expansion tool.

in a first embodiment, a tapered point is arranged on the bottom side of a plunger, this point cooperating with an expansion tool, which basically consists of a ball cage, a number of balls being arranged in its periphery. This ball is brought opposite the claw it is to deform. When the tapering point of the plunger penetrates the ball cage, the balls are displaced radially outward and thus deform the claws radially outward in the hole of the door section.

In a second example embodiment, a scissor-like ((schwerenartig—misprint for scherenartige)) arrange is provided, two-armed levers lying with one lever section on the bottom side of the axially moveable screw-on plate and the other moveable lever section on the inner side of the housing barrel.

It is possible that the housing barrel will already contain finish-bent claws, which have points that are already bent radially outward; in this case, these pre-deformed claws need only be deformed radially outward with a special tool without the necessity for bending additional points.

In a fourth embodiment of the expansion tool, the axially moveable plunger has a tapered point. This point engages a slide housing in which contains radially displaceable slides in a spaced arrangement, each slide setting with its outer surface on an associated claw in the side wall of the housing barrel.

The inner side of the slides is tapered in this case so that all the slides together form a tapered hole, which is penetrated by the tapered point of the plunger. When the plunger now moves downward in the direction of the bottom surface of the housing barrel, the tapered adjacent surfaces of the plunger and the slides cause a radially outward movement of the slides, which thus deform the previously undeformed claws in the housing barrel in a radially outward direction, so that the claws dig into the material in the side wall of the hole in the door section.

To restore the slides into the initial position, they can be brought back through spring force into the initial position, or it is possible for the slides to have tapering surfaces so that they will automatically return to their base position when the plunger is withdrawn.

With respect to the screw-on plates, the plunger, the hold-down and the like, the same statements given for the first example embodiment apply for all the following example embodiments. Consequently, only the differences from the first embodiment will be explained. However, the generally applicable description is to be associated with each example embodiment.

In the fifth example embodiment, the hold-down has bearings, which support pivoting one-armed levers. On their radially inward directed sides, the levers have bevels associated with a bevel in the area of the cone on the point of the plunger. When the plunger moves axially toward the bottom of the housing barrel, the sliding of the bevel of the conte of the plunger on the bevel of the levers causes the levers to move radially outward, whereby the lever points in turn lie on the previously undeformed claws and these claws then bend radially outward and dig into the material in the hole of the door section.

In the sixth example embodiment, the levers are replaced by corresponding pivot bearings mounted on corresponding shoulders on the bottom side of the hold-down. The same statements given for the second example embodiment apply in other respects. That is, the plunger also penetrates the furniture barrel with a tapering point and slides along opposing tapering surfaces of the pawls, so that they in turn can pivot radially outward in their pivot bearings and deform the claws 4 of the housing barrel.

The seventh example embodiment provides for a thrust ring with rocker.

In this case, bearings for two-armed levers are arranged on the bottom side of the screw-on plate, the levers moving with their radially outward surfaces on radially inward wedge-like surfaces of the thrust ring. This converts the movement of the plunger directed axially downward into a turning movement of the two-armed levers, and these levers press radially outward with their pivoting end on the claws of the housing barrel and deform them, directing them into the hole of the door section.

In an eighth example embodiment, the movement of the plunger directed axially downward is converted into a turning movement of the expansion tool. In this case, there is a suitable turning link arranged between the plunger and the expansion tool, the expansion tool having associated turning shoulders on the outer periphery, which lie screw-like against the inner side of the housing barrel and like with their wedge surfaces tapering in the direction of the circumference on the claws, which are thus deformed radially outward.

Also claimed here is the kinematic reversal where the entire housing barrel is twisted so that the claws arranged on the outer periphery dig like screws into the material in the hole in the door section. The claws are finished-deformed in this case, and the expansion tool now serves only for turning the entire furniture barrel, which thus turns like a screw into the hole of the door section. The claws are thus designed like the pitches of a screw and thus dig into the material.

The subject-matter of the present innovation arises not only form the subject-matter of the individual claims, but rather also from a combination of the individual claims with each other.

All details and feature disclosed in the documents, particularly the spatial arrangement illustrated in the drawings, are claimed as essential to the invention to the extent they are new compared to the state of the art either individual or in combination.

The invention will be explained in more detail using drawings illustrating a number of embodiment approaches. Other features essential to the invention and advantages of the invention will be seen in the drawings and their description.

DESCRIPTION OF THE PREFERRED EMBODIMENT

Figure 1:
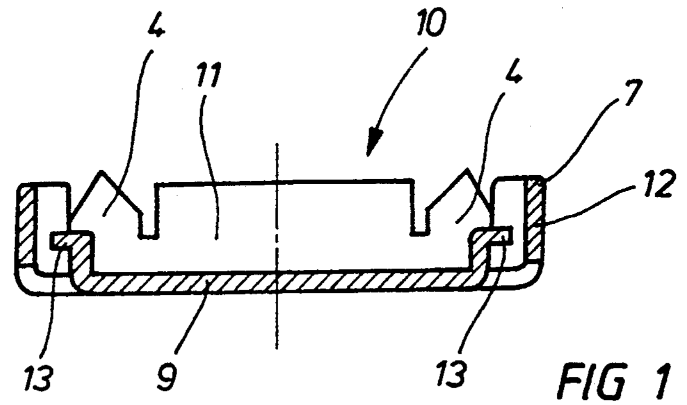
FIG. 1 is a section through a housing barrel.
Figure 2:
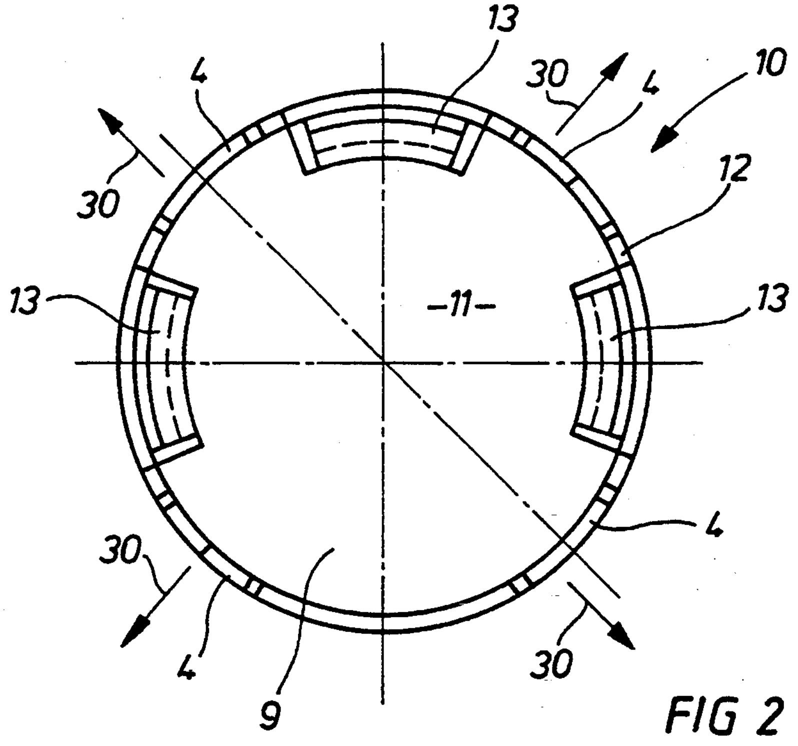
FIG. 2 is a plan view of the housing barrel.

The housing barrel 10 according to FIG. 1 and 2 consists basically of a barrel-like metal part, which has a bottom 9 defining the circular walling 12. In the area of the side walls 12, suitable punchings (cf. FIG. 1) define claws 4, which are still undeformed in the example embodiment illustrated. These claws have suitable points, which on subsequent deformation dig into the material in the door section 2. The deformation of the claws 4 in this case is directed radially outward in the arrow direction 30 (cf. FIG. 2).

For anchoring the housing barrel 10 with a corresponding barrel hinge, the bottom 9 is provided with turn-in hooks 13 in which the barrel part (not shown) is hung link a bayonet and a locked in place.

Figure 3:
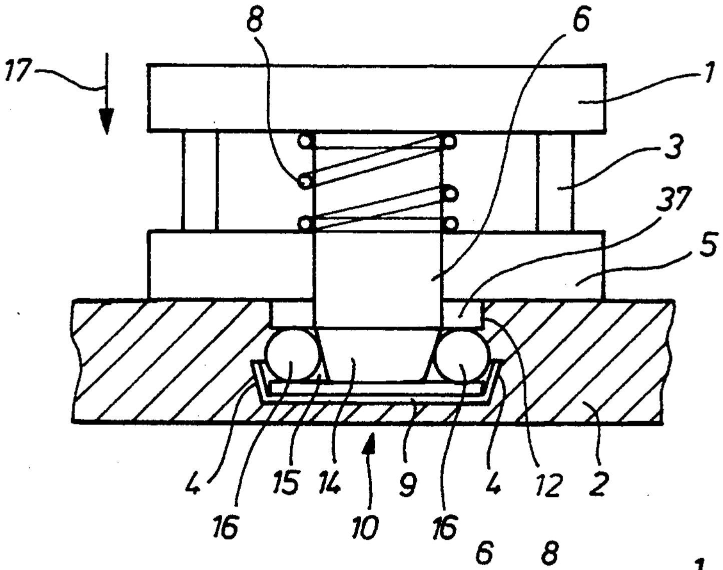
FIG. 3 is a schematic of a first example embodiment.

The edge 7 of the housing barrel 10 is made low enough so that it does not project over the surface of the door section 2 (cf. FIG. 3, for example).

In the first example embodiment, a plunger 6 is mounted on the bottom side of a screw-on plate 1, which is arranged together with the plunger on the piston rod of an actuating cylinder (not shown) (cf. FIG. 3). A guide 3 is provided at the bottom side of the screw-on plate 1 to permit a parallel guidance of the screw-on plate 1 with the plunger 6 in a plan vertical to a door section 2. A hold-down 5 is provided on the guide 3 and sits on the surface of the door section 2, being spring-loaded by a spring 8.

Arranged in the door section 2 is a hole 37 in which the housing barrel is inserted, the claws 4 still being undeformed.

The point of the plunger, which has a cone 14, engages the interior 11 of the housing barrel 10 and cooperates there with an expansion tool.

This expansion tool consists basically of a ball cage 15 holding a number of radially displaceable balls 16. Each ball 16 is associated with a claw 4 and lies against its inner walling.

When the cone 14 now penetrates the ball cage with a movement directed downward (arrow direction 17), the balls are displaced radially outward and deform the claws 4 in a radially outward direction so that the claws 4 dig into the material of the hole 37 in the door section 2.

The ball cage 15 is mounted on the bottom side of the hold-down 5 by means of a mounting support (not shown).

Figure 4:
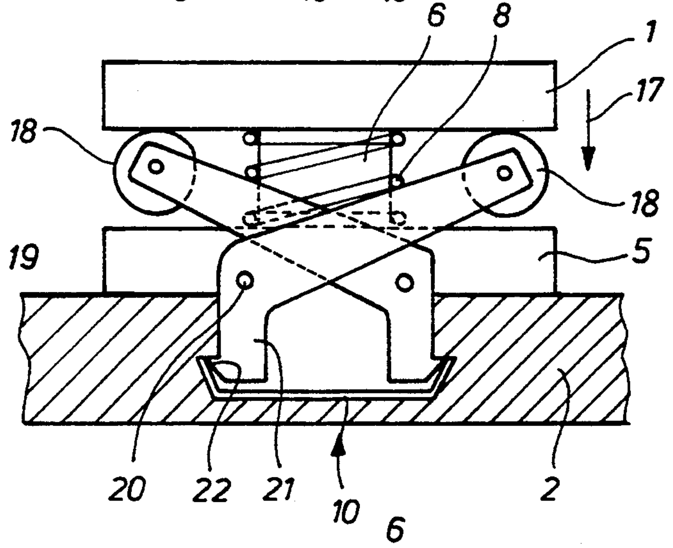
FIG. 4 shows the second example embodiment.

In the second example embodiment according to FIG. 4, there is a similar application in which the previously mentioned ball cage 15 with the balls 16 is replaced by two-armed levers 19. Each lever 19 has a rotating connection at its end with a roller 18, which lies against he bottom side of the screw-on plate 1. Each lever 19 has a rotating connection at its end with a roller 18, which lies against the bottom side of the screw-on plate 1. Each lever 19 pivots in a beating 20 in the area of the hold-down 5. When the screw-on plate 1 is moved downward in the arrow direction 17, the tapering projections 22 on the lever section 21 spread radially outward and deform the claws 4 accordingly radially outward.

Figure 7:
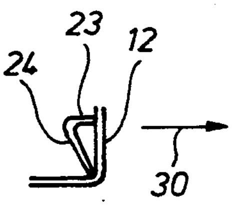
FIG. 7 is a detail of the side wall of the furniture barrel of FIG. 6.
Figure 5:
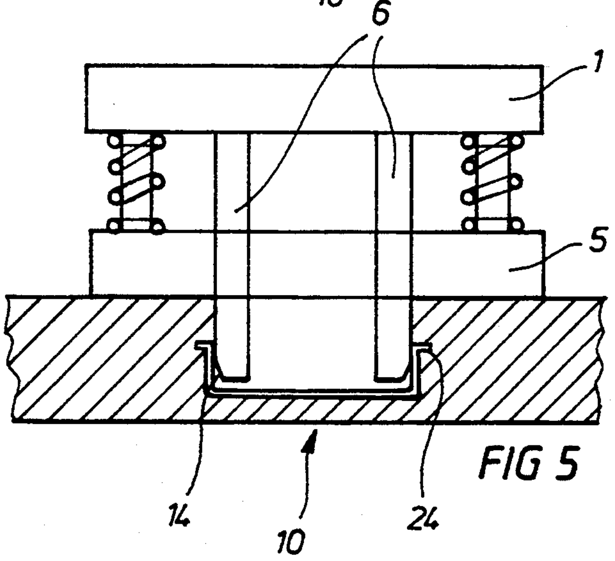
FIG. 5 shows a third example embodiment.
Figure 6:
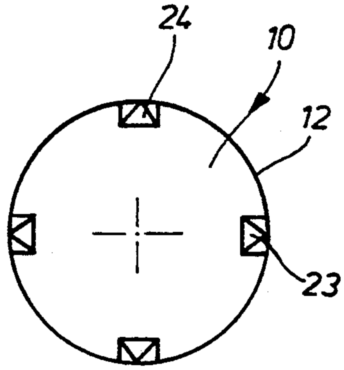
FIG. 6 is a plan view of the furniture barrel relative to the example embodiment in FIG. 5.

In the third example embodiment according to FIG. 5 to 7, the claws 24 are already provided with radially outwardly deformed points 23, but are bent radially inwardly into the interior 11 of the housing barrel 10 when the housing barrel 10 is in the unassembled condition. This is seen in FIG. 6 and 7.

With the cone 14 arranged on the plunger, the cone 14 lies against the inner side of the claws 24 and, as a function of the downward motion of the plunger 6, the wedge surfaces of the cone slide along the claws 24 so that the latter are deformed radially outward in the arrow direction 30 out of the side wall 12.

Figure 8:
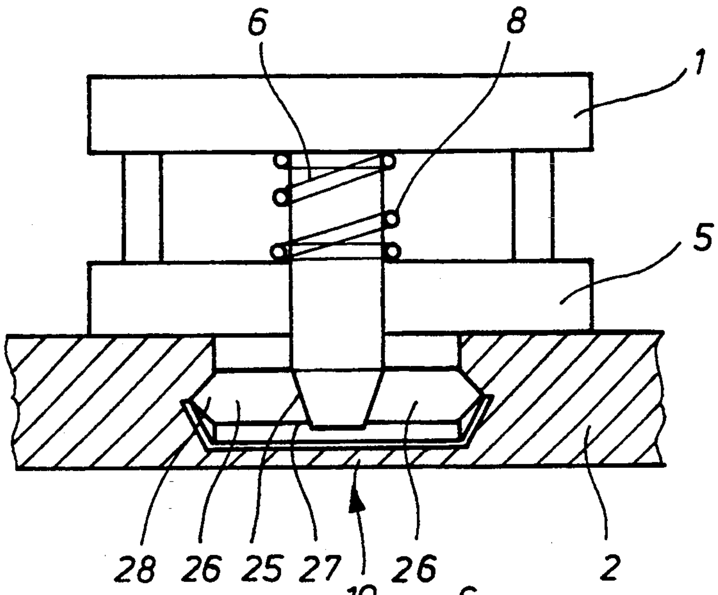
FIG. 8 is a schematic of a fourth example embodiment.

In the fourth example embodiment according to FIG. 8, an arrangement is shown that is similar to FIG. 3. In this case, a slide arrangement is provided instead of the ball cage with balls. In a slide housing 27 mounted on the bottom side of the hold-down 5, a number of slides 26 can be displaced radially under guidance, each slide being associated with a corresponding claw 4. The inner side of the slides 26 has tapering wedge surfaces against which the corresponding cone 14 of the plunger 6 lies. All the wedge surfaces thus form a tapered hole 25. When the cone 14 of the plunger 6 penetrates this tapered hole 25 of the slides 26, the latter are moved radially outward in the slide housing 27 and press the claws 4 into the material of the door section 2.

If the slides 26 are also tapered upward in the direction of a withdrawal movement of the plunger 6, there is the advantage that, on return of the plunger 6 into the starting position, the slides 26 are returned to their starting position at the same time without engaging the hole 37 in the door section. In another embodiment (not illustrated), provision can be made for the slides 26 to be pulled back into their starting position by suitable return springs.

Figure 9:
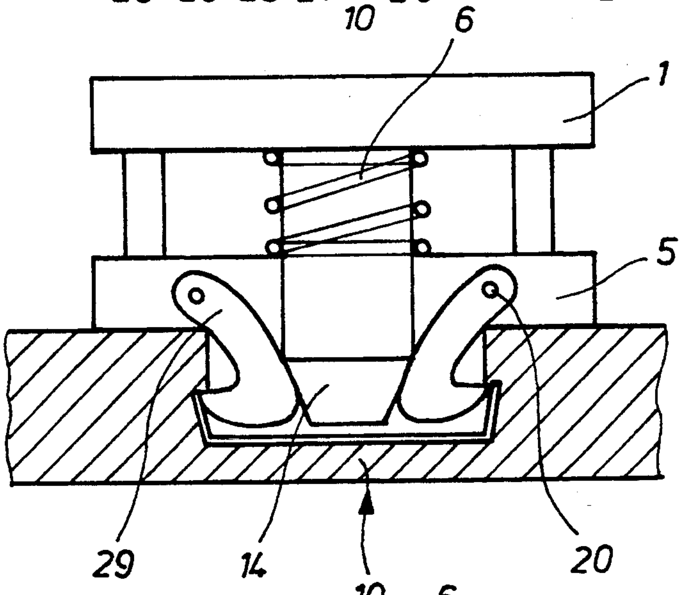
FIG. 9 is a schematic of a fifth example embodiment.

In the fifth example embodiment according to FIG. 9, the hold-down 5 has bearings 20 for one-armed levers 29, which support themselves with their rotating ends on the associated claws. When the cone 14 of the plunger 6 penetrates the interior 11 of the furniture barrel 1 ((sic)), the tapering surfaces of the cone 14 slide on the associated radially outward directed and beveled surfaces of the levers 29, and the latter are pivoted radially outward and thus deform the claws 4.

Figure 10:
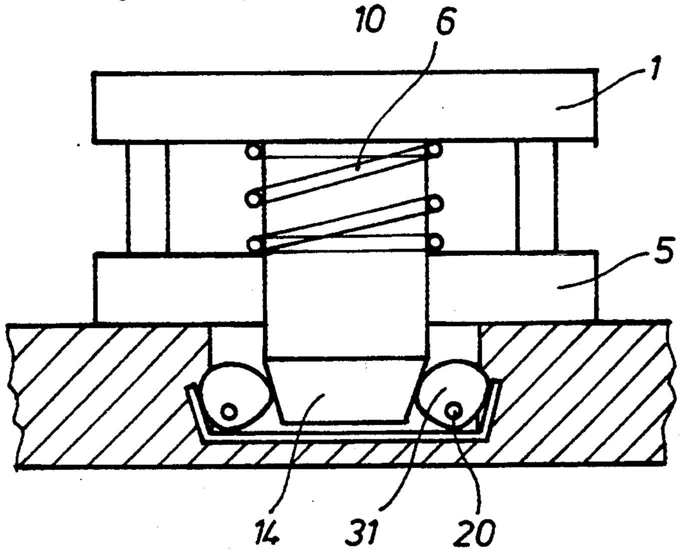
FIG. 10 shows a sixth example embodiment.

In the sixth example embodiment according to FIG. 10, the arrangement is similar to that in FIG. 9, but the one-armed levers 29 are replaced by corresponding pawls 31, which pivot in the bearings 20 on mounting supports (not shown) on the bottom side of the hold-down 5. The same statements given for FIG. 9 apply in other respects.

Figure 11:
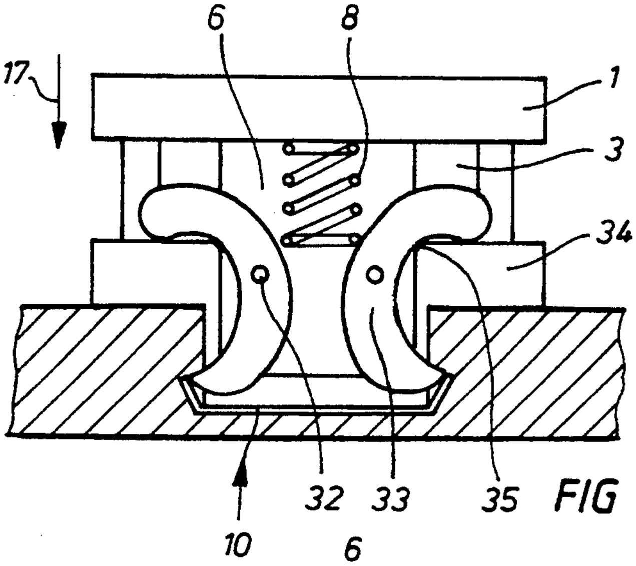
FIG. 11 shows a seventh example embodiment.

The seventh example embodiment according to FIG. 11 provides for a thrust ring with rocker.

Rockers 33 designed as two-armed levers pivot in suitable bearings 32 on the plunger 6. The surfaces of the rockers 33 directed radially outward and beveled in the advancing direction of the plunger 6 shift in this case along associated radially inwardly directed surfaces of a thrust ring 34, which serves at the same time as a hold-down. Thus, when the plunger 6 is run with the rockers 33 downward into the interior 11 of the housing barrel 10, there is a relative displacement of the rockers 33 on the thrust ring 34 in the area of the shifting surfaces 35, and the points of the rockers 33 engaging the housing barrel 10 deform the claws 4 radially outward.

Figure 13:
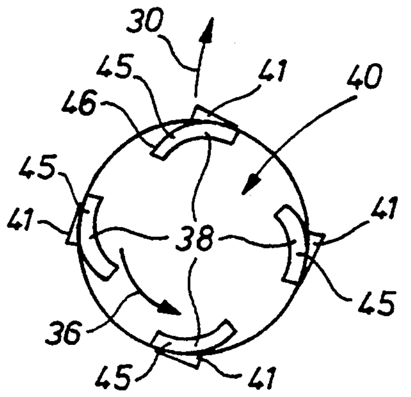
FIG. 13 is a plan view of the housing barrel for the example embodiment according to FIG. 12.
Figure 12:
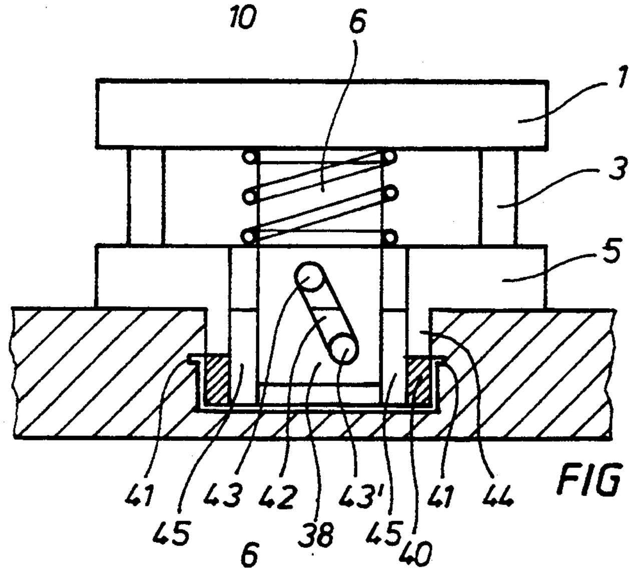
FIG. 12 shows an eight example embodiment.

In the eighth example embodiment according to FIG. 12 and 13, the downward movement of the plunger 6 in the arrow direction 17 is directly converted into a rotating movement by a suitable turning link 42. One or more guide pins 43 are arranged in the radial direction on the periphery of the plunger and engage an associated beveled turning link 42 designed as a guide slot. The guide pin 43 is shown in two different positions 43, 43' in FIG. 12. The expansion tool 38 accordingly consists of a turning bushing, which supports the turning link 42 designed as a guide slot. The plunger 6 engages this expansion tool 38 with its guide pin 43. The expansion tool 38 according to FIG. 13 is thus turned in the arrow direction 36 in the manner described.

Wedge-shaped turning shoulders are arranged in this case on the outer periphery of the expansion tool 38, the turning shoulders 45 having radially outward directed wedge surfaces 46. As each turning shoulder 45 is turned, the claws 41 bent inward and pre-deformed beforehand in the interior 11 of the housing barrel 10 are pressed out of the side wall of the housing barrel 40 and thus dig into the position according to FIG. 13 in the material in the door section 2.

Provision is also made in this case for shoulders 44 to be located on the bottom side of the hold-down 5 and to be place don the undeformed side walls 12 (in the area of the edge 7) of the housing barrel 40 to prevent it from turning.

Figure 15:
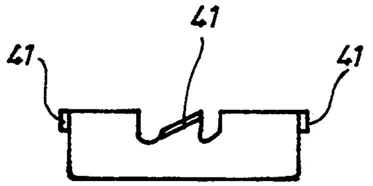
FIG. 15 is a side view of the housing barrel according to FIG. 14.
Figure 14:
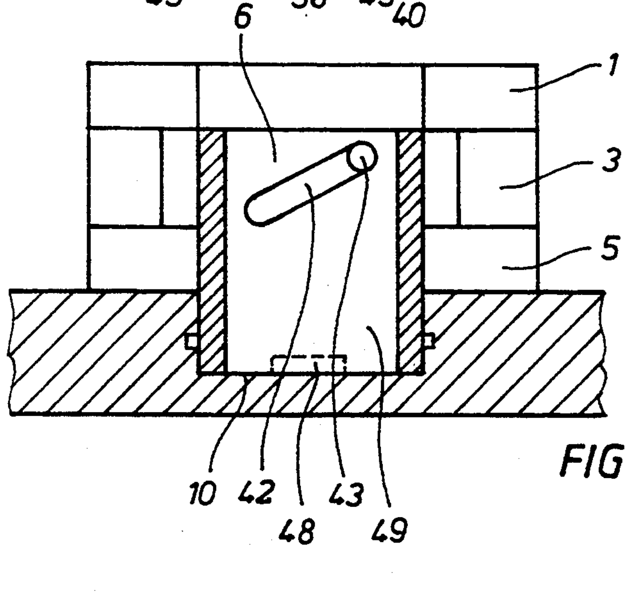
FIG. 14 shows a ninth example embodiment.
Figure 16:
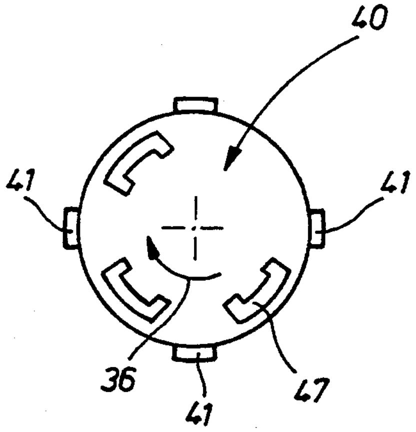
FIG. 16 is a plan view of the housing barrel according to FIG. 15.

In the ninth example embodiment according to FIG. 14 to 16, on the other hand, the housing barrel 40 turns as a unit.

In this case, a bushing-like turning tool 49 is provided on the bottom side of the plunger 6, which is engaged by the plunger 6, the plunger being provided in the previously described way with a guide pin 43, which engages a turning link 42 in the turning tool 49. When the downwardly directed plunger movement, the turning tool 49 is thus turned in the arrow direction 36 and drives the entire housing barrel 40 in the arrow direction 36 in this example embodiment.

In order to ensure a positive connection between the turning tool 49 and the housing barrel 40, provision is made for suitable drivers 48 to be arranged on the bottom side of the turning tool 49, which engage driver slots 47 in the bottom surface of the housing barrel 40.

Claws 41 with screw-like shapes are arranged in this case on the outer periphery of the housing barrel 40, which are thus not deformed radially outward in this example embodiment, rather being only screwed into the material of the hole 37 in the door section 2 like the thread pitch of a screw.

What is claimed is:

1. A tool for anchoring a housing barrel in a hole in a furniture plate, the housing barrel having a bottom defining a barrel edge, the tool comprising: a support plate moveable axially with respect to the housing barrel; a hold down member spaced from and parallel to the support plate and positioned against the furniture plate; a plunger associated and moveable with the support plate and extendable through the hold down member in a plane perpendicular to the furniture plate; guide means slidably associated with the support plate and hold down member to permit parallel guidance of the support plate with the plunger; a plurality of pivotable levers secured to the hold down member, each lever having a pivot end and a claw shaped end; a tapered cone formed at one end of the plunger and operable therewith to engage and deflect the claw ends radially with respect to the housing barrel when the support plate and plunger are moved axially with respect to the housing barrel to anchor the housing barrel in the furniture hole whereby the plunger tapered cone end deforms the claw ends when the plunger moves axially to anchor the housing.

* * * * *